(12) United States Patent
Battisti et al.

(10) Patent No.: US 10,663,323 B2
(45) Date of Patent: May 26, 2020

(54) SYSTEM FOR MEASURING THE POSITION OF A MECHANICAL MEMBER

(71) Applicants: GIULIANI S.R.L., Suzzara (IT); OPTOELETTRONICA ITALIA S.R.L., Gardolo (IT)

(72) Inventors: Nicola Battisti, Malosco (IT); Alfredo Maglione, Povo (IT)

(73) Assignees: Giuliani S.R.L., Suzzara (IT); Optoelettronica Italia S.R.L., Gardolo (IT)

( * ) Notice: Subject to any disclaimer, the term of this patent is extended or adjusted under 35 U.S.C. 154(b) by 121 days.

(21) Appl. No.: 15/925,788

(22) Filed: Mar. 20, 2018

(65) Prior Publication Data
US 2018/0266853 A1 Sep. 20, 2018

(30) Foreign Application Priority Data

Mar. 20, 2017 (IT) ................................ 10201730602

(51) Int. Cl.
*G01D 5/347* (2006.01)
*G01D 5/245* (2006.01)

(52) U.S. Cl.
CPC ..... *G01D 5/34746* (2013.01); *G01D 5/34784* (2013.01); *G01D 5/2455* (2013.01); *G01D 5/3473* (2013.01)

(58) Field of Classification Search
CPC ............ G01D 5/34746; G01D 5/3473; G01D 5/2455; G01D 5/34784; G01D 5/246; F15B 15/2846; G01B 11/00

USPC ............ 250/559.29, 559.32, 231.13–231.18, 250/237 G, 237 R
See application file for complete search history.

(56) References Cited

U.S. PATENT DOCUMENTS

| | | | | |
|---|---|---|---|---|
| 5,977,539 A | * | 11/1999 | Holzapfel | ................ G01D 5/38 250/231.14 |
| 6,327,791 B1 | * | 12/2001 | Norcross | ............. F15B 15/2846 33/706 |
| 6,452,158 B1 | * | 9/2002 | Whatley | ............. F15B 15/1457 250/231.13 |
| 6,664,535 B1 | | 12/2003 | Nahum et al. | |

(Continued)

FOREIGN PATENT DOCUMENTS

| | | |
|---|---|---|
| DE | 10201608 | 7/2003 |
| WO | 2015019231 | 2/2015 |

*Primary Examiner* — Seung C Sohn
(74) *Attorney, Agent, or Firm* — Mark M. Friedman

(57) ABSTRACT

System for measuring the position of a mechanical member, which comprises an optical detection system and a positioning track arranged on two mechanical members of a mechanical device. The positioning track is provided with a succession of multiple sectors, each of which comprises a first delimitation section and a second delimitation section spaced from each other, and a first identification section and a second identification section which are provided with a different optical contrast with respect to the first delimitation section and to the second delimitation section. In each sector, the first identification section is delimited between the first delimitation section and the second delimitation section. In addition, the length of the identification sections of each sector is different from the length of the identification sections of each other sector of the succession, so as to unequivocally identify the corresponding sector.

6 Claims, 10 Drawing Sheets

(56) References Cited

U.S. PATENT DOCUMENTS 6,963,409 B2 * 11/2005 Benner .............. G01D 5/34715
  250/201.5
2016/0177981 A1 6/2016 Maglione et al.

* cited by examiner

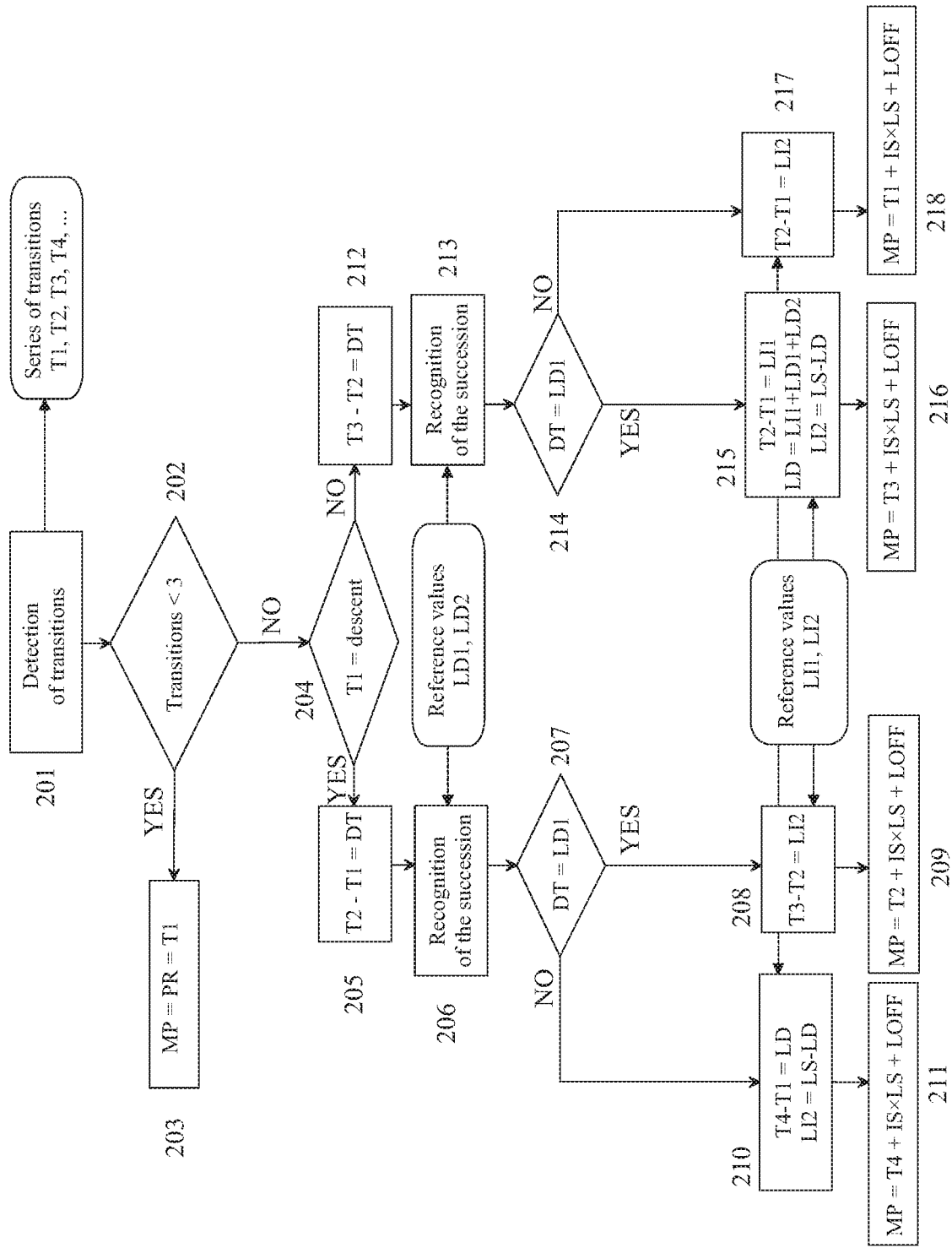

SYSTEM FOR MEASURING THE POSITION OF A MECHANICAL MEMBER

FIELD OF APPLICATION

The present invention regards a system for measuring the position of a mechanical member.

The present system is inserted in the field of production of mechanical devices provided with movable members and is advantageously employable in order to detect, preferably continuously, the absolute position of such movable members.

In particular, the present system is usable in the field of production of linear actuators (e.g. hydraulic cylinders or pneumatic cylinders, valves), pumps, joysticks, etc.

Preferably, the present system is intended to be applied to linear actuators, such as in particular hydraulic cylinders, for measuring the position of the translation members of such linear actuators.

STATE OF THE ART

Detection systems, in particular of optical type, are known in the state of the art; they are employed in linear actuators, such as a hydraulic cylinder, in order to detect the position of the piston of the hydraulic cylinder with respect to the containment jacket. In particular, the patent application WO 2015/019231 describes a detection system of known type comprising a positioning track obtained along the stem of the piston of a hydraulic cylinder, and an optical measuring device fixed to the jacket of the hydraulic cylinder and adapted to film a specific detection window on the positioning track.

In particular, the optical device is provided with a light source, such as a LED, adapted to emit a light radiation on the positioning track, and an optical sensor, such as a linear sensor, adapted to detect a reflected radiation coming from the positioning track itself. The positioning track is provided with a succession of sectors, each of which constituted by two sections with different optical contrast arranged one after the other.

In particular, each sector is provided with a first section, with low reflection coefficient (e.g. black color), and with a second section with high reflection coefficient.

More in detail, the stem of the piston is provided with a chromium-plated surface on which the first sections of the sectors of the positioning track are obtained, by means of for example laser ablation, while the second sections are obtained from the non-machined zones of the chromium-plated surface of the stem.

The first section of each sector has thickness greater than the first section of the preceding sector by a specific increment pitch, in a manner such that the sectors of the positioning track have the first sections with thickness increasing from the first sector to the last sector of the succession.

In operation, when each sector of the positioning track passes onto the detection window of the optical device, the latter detects a corresponding signal representative of the thickness of the first section of such sector and generates a corresponding electrical signal that identifies the position of the sector along the positioning track and therefore the position of the stem of the piston with respect to the jacket of the hydraulic cylinder. This solution of known type has proven susceptible of optimization for the grounds set forth hereinbelow.

The machined zones of the stem of the cylinder, which form the first sections of the sectors of the positioning track, cover a significant area of the latter, in particular having relatively large size at the final sectors of the succession. This involves high costs and long operating times for actuating the laser ablation process employed for making the first sections of the positioning track.

In addition, the machined zones of the chromium-plated surface of the stem of the piston, due to the alteration of the chromium plating, are more greatly subjected to corrosion phenomena (in particular in work conditions in which the piston is subjected to aggressive agents) and to wear (due to the rubbing between the stem and the gaskets of the jacket of the hydraulic cylinder).

In addition, the above-described configuration of the positioning track involves a physical limit of the maximum measurable length of the piston with respect to the jacket of the cylinder, since—following the subsequent increases of the thickness of the first sections of the positioning track— the first section of the latter sector covers the entire sector, not allowing the arrangement of further sectors. In particular, in order to increase the maximum measurable length of the system, it is necessary to increase the size of the sectors of the positioning track, hence requiring the increase of the size of the optical sensor, with consequent structural problems for the arrangement of the sensor on the hydraulic cylinder, or the decrease of the increment pitch of the first sections from one sector to the next, requiring the use of extremely precise and hence quite costly machining processes.

In addition, the first sectors of the positioning track, being for the most part constituted by chromium-plated surface, have large areas with high reflection coefficient, while the final sectors of the positioning track, being for the most part constituted by machined zones, have large areas with low reflection coefficient. Such strong difference of the reflection coefficient of the sectors of the positioning track requires executing, during the operation of the system, an adjustment of the brightness of the light source of the optical device, in a manner such that the radiation reflected by each different sector can be detected in a reliable manner by the optical device, with consequent high functional and manufacturing complexity of the system.

Presentation of the Invention

In this situation, the essential object of the present invention is therefore to overcome the drawbacks manifested by the solutions of known type, by providing a system for measuring the position of a mechanical member which allows optimizing the costs and times for making the system.

A further object of the present invention is to provide a system for measuring the position of a mechanical member, which ensures an optimal reliability of the mechanical member, in particular a high resistance to corrosion and wear.

A further object of the present invention is to provide a system for measuring the position of a mechanical member, which allows obtaining high extension of the maximum measurable length.

A further object of the present invention is to provide a system for measuring the position of a mechanical member that is structurally simple and quick.

BRIEF DESCRIPTION OF THE DRAWINGS

The technical characteristics of the invention, according to the aforesaid objects, can be clearly seen in the contents of the below-reported claims and the advantages thereof will be more evident from the following detailed description, made with reference to the enclosed drawings, which represent several merely exemplifying and non-limiting embodiments of the invention, in which:

FIG. 10 illustrates an example of implementation of a processing step of the abovementioned measuring method.

DETAILED DESCRIPTION OF A PREFERRED EMBODIMENT

Figure 1:
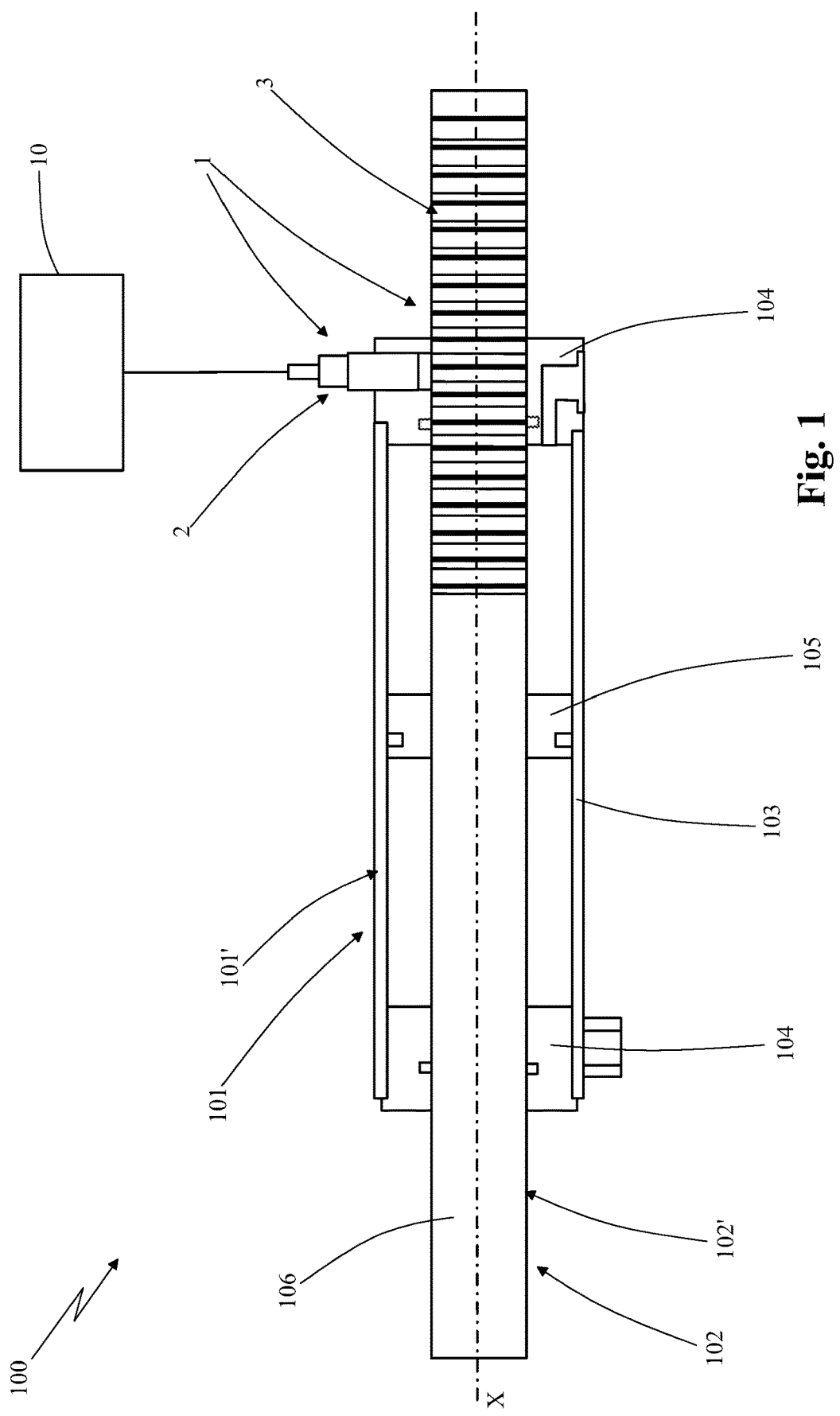
FIG. 1 illustrates a sectional view of a device to which the present measuring system is applied, according to a first embodiment of the present invention.

With reference to the enclosed drawings, reference number 1 overall indicates a system for measuring the position of a mechanical member, object of the present invention.

In accordance with the embodiments illustrated in the enclosed figures, the present system 1 is intended to be applied to a mechanical device 100 provided with at least one movable member in order to detect, preferably continuously, the absolute position of such movable member.

In particular, the aforesaid mechanical device 100 comprises at least one first mechanical member 101 and at least one second mechanical member 102 that are movable with relative motion with respect to each other.

Figure 2:
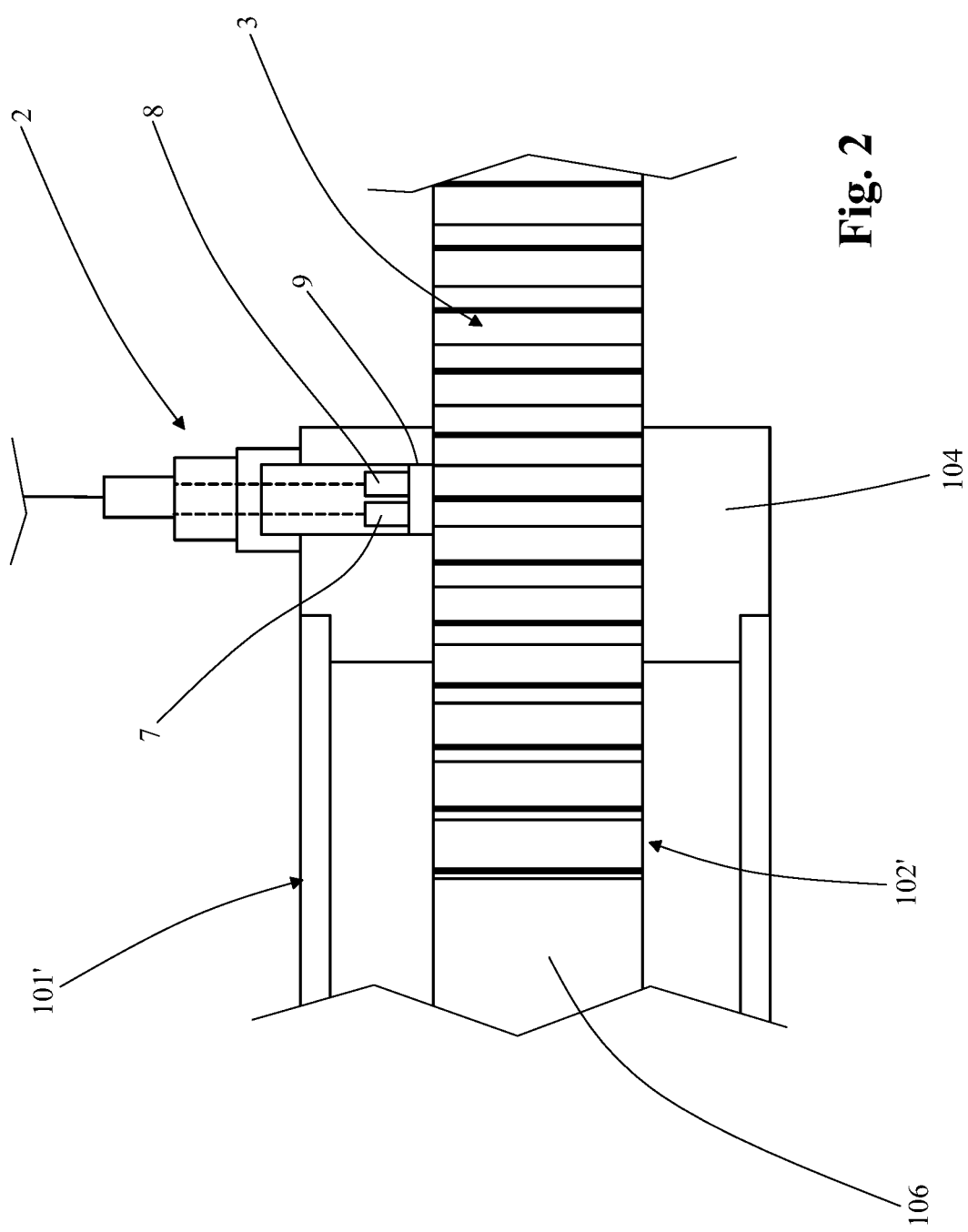
FIG. 2 illustrates a detail of the system illustrated in FIG. 1, relative to an optical detection system and to a positioning track.

In accordance with a first embodiment illustrated in FIGS. 1 and 2, the present system 1 is applicable to a mechanical device 100 whose mechanical members 101, 102 are movable with linear motion with respect to each other.

In particular, such mechanical device 100, according to the aforesaid first embodiment, comprises a linear actuator (e.g. a hydraulic cylinder or a pneumatic cylinder, a piston, a brake, a valve), a plunger pump, etc.

With reference to the particular example illustrated in FIG. 1, the mechanical device 100 is a hydraulic cylinder, whose first mechanical member 101 is a jacket 101' extended between two ends according to an axis X, and whose second mechanical member 102 is a piston 102' slidably coupled to the jacket 101' and linearly movable according to the aforesaid axis X. More in detail, the jacket 101' is provided with a tubular body 103 with axis X closed at the ends by two closure walls 104 provided with corresponding through holes. The piston 102' comprises a plunger 105 inserted in the jacket 101' and a stem 106 fixed to the plunger 105, extended parallel to the axis X and slidably and sealingly inserted in the through holes of the closure walls 104.

Figure 8:
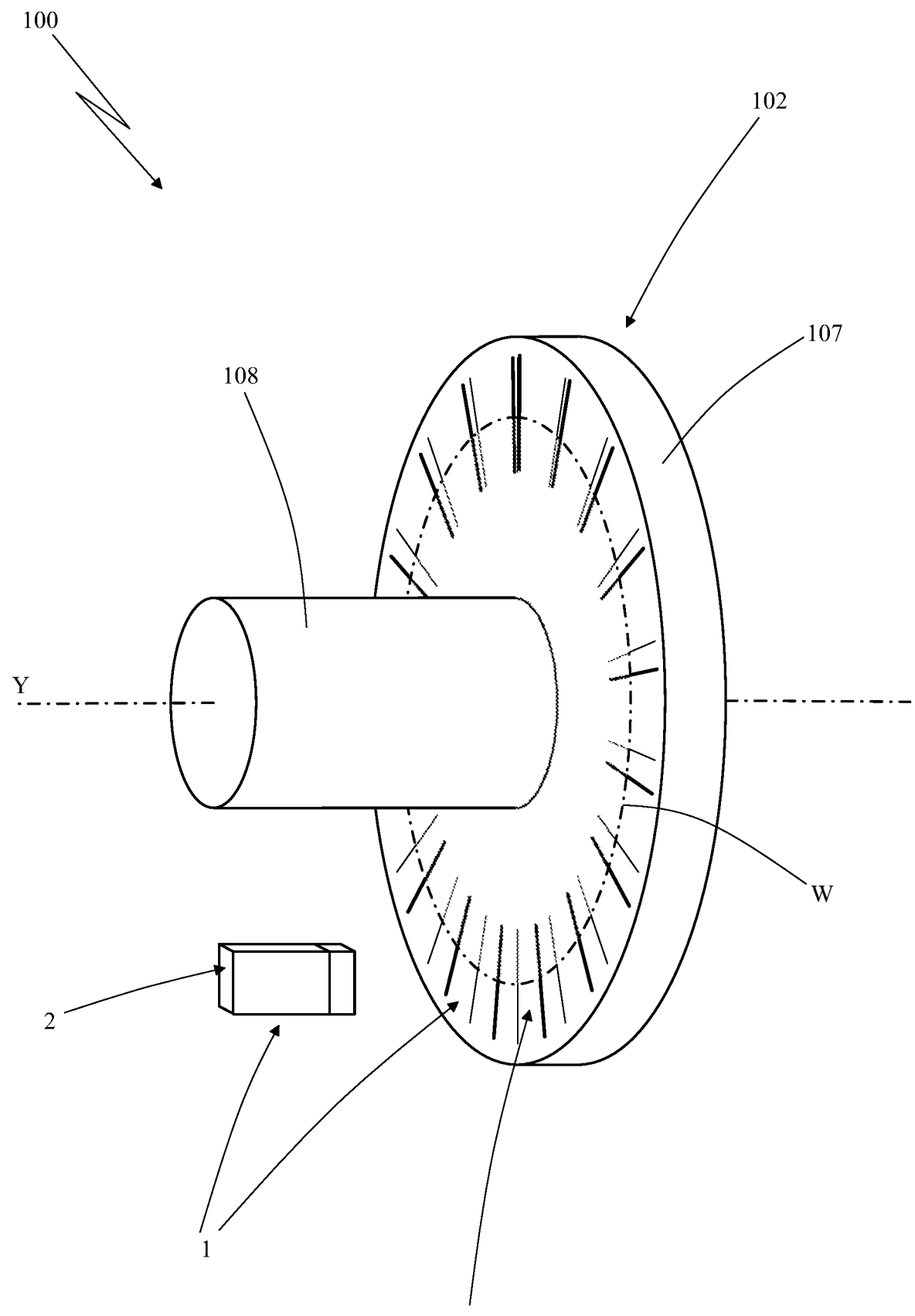
FIG. 8 illustrates a perspective view of a device (with some parts removed) to which the present measuring system is applied, according to a second embodiment of the present invention.

In accordance with a second embodiment illustrated in FIG. 8, the present system 1 is applicable to a mechanical device 100 whose mechanical members 101, 102 are movable with rotational motion with respect to each other.

With reference to the particular example illustrated in FIG. 8, the mechanical device 100 comprises an angular position transducer, whose first mechanical member 101 comprises a support body (not illustrated in FIG. 8) and the second mechanical member 102 comprises a rotatable disc 107 provided with a rotation shaft 108 rotatably constrained to the support body in order to rotate around a rotation axis Y aligned with the aforesaid rotation shaft 108.

In accordance with a further embodiment not illustrated in the enclosed figures, the present system 1 is applicable to a mechanical device 100 whose mechanical members 101, 102 are movable with rotational-translational motion with respect to each other. According to the present invention, the system 1 comprises an optical detection system 2 intended to be arranged on the first mechanical member 101 of the mechanical device 100, and a positioning track 3 intended to be arranged on the second mechanical member 102 of the mechanical device 100.

In accordance with the embodiments illustrated in the enclosed figures, the first mechanical member 101 is the fixed member of the mechanical device 100 and the second mechanical member 102 is the movable member, in a manner such that the optical detection system 2 is arranged on the fixed member and the positioning track 3 is arranged on the movable member.

In particular, with reference to the example illustrated in FIGS. 1 and 2, the optical detection system 2 is fixed on the jacket 101' of the hydraulic cylinder, in particular at one of the closure walls 104 of the jacket 101' itself, and the positioning track 3 is obtained on the stem 106 of the piston 102' of the hydraulic cylinder.

With reference to the example of FIG. 8, the optical detection system 2 is fixed on the support body of the mechanical device 100 and the positioning track 3 is obtained on one of the faces of the rotatable disc 107 of the second mechanical member 102.

Of course, without departing from the present invention, the optical detection system 2 can be arranged on the movable member while the positioning track 3 can be arranged on the fixed member.

Figure 3:
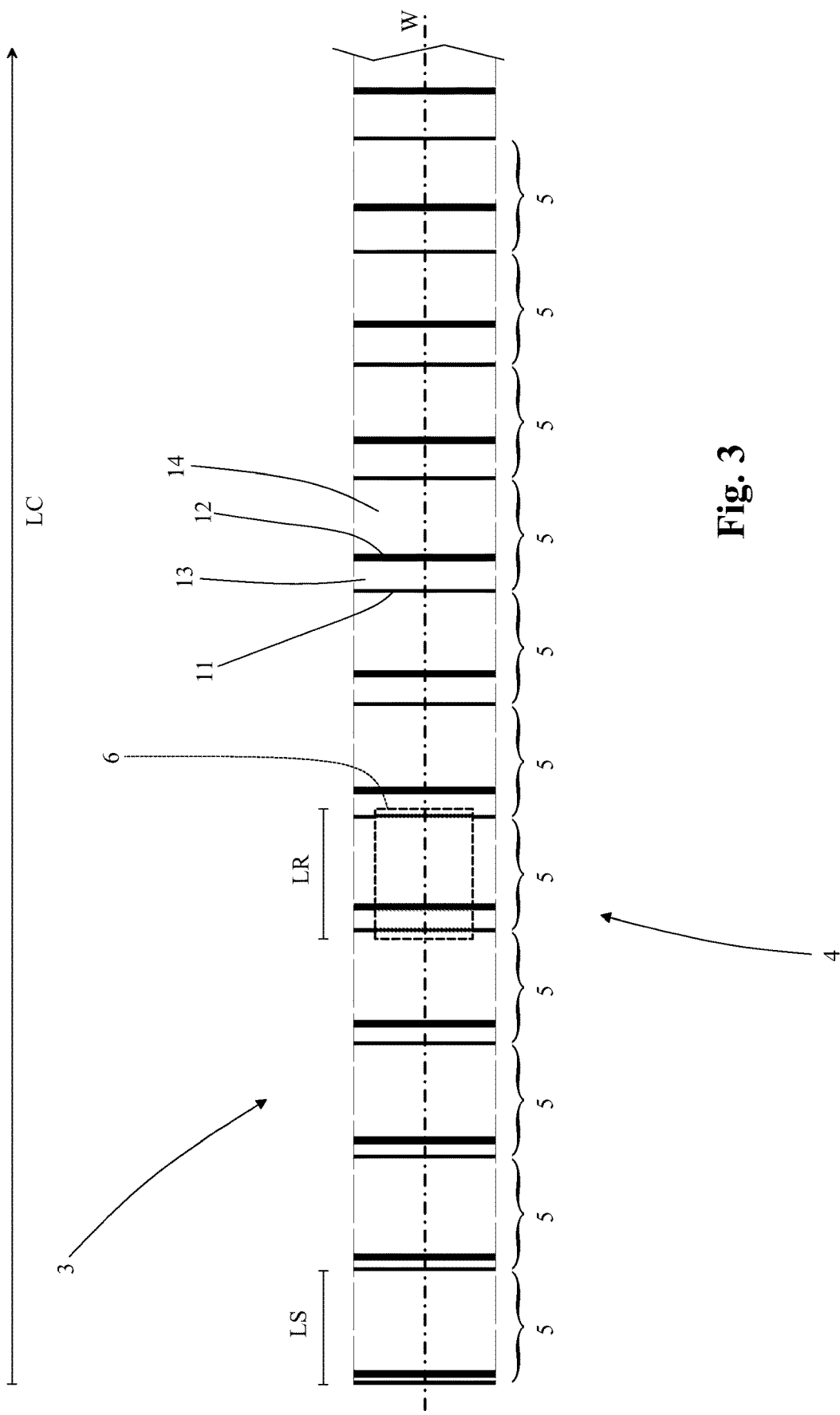
FIG. 3 illustrates the positioning track of the present system.
Figure 4:
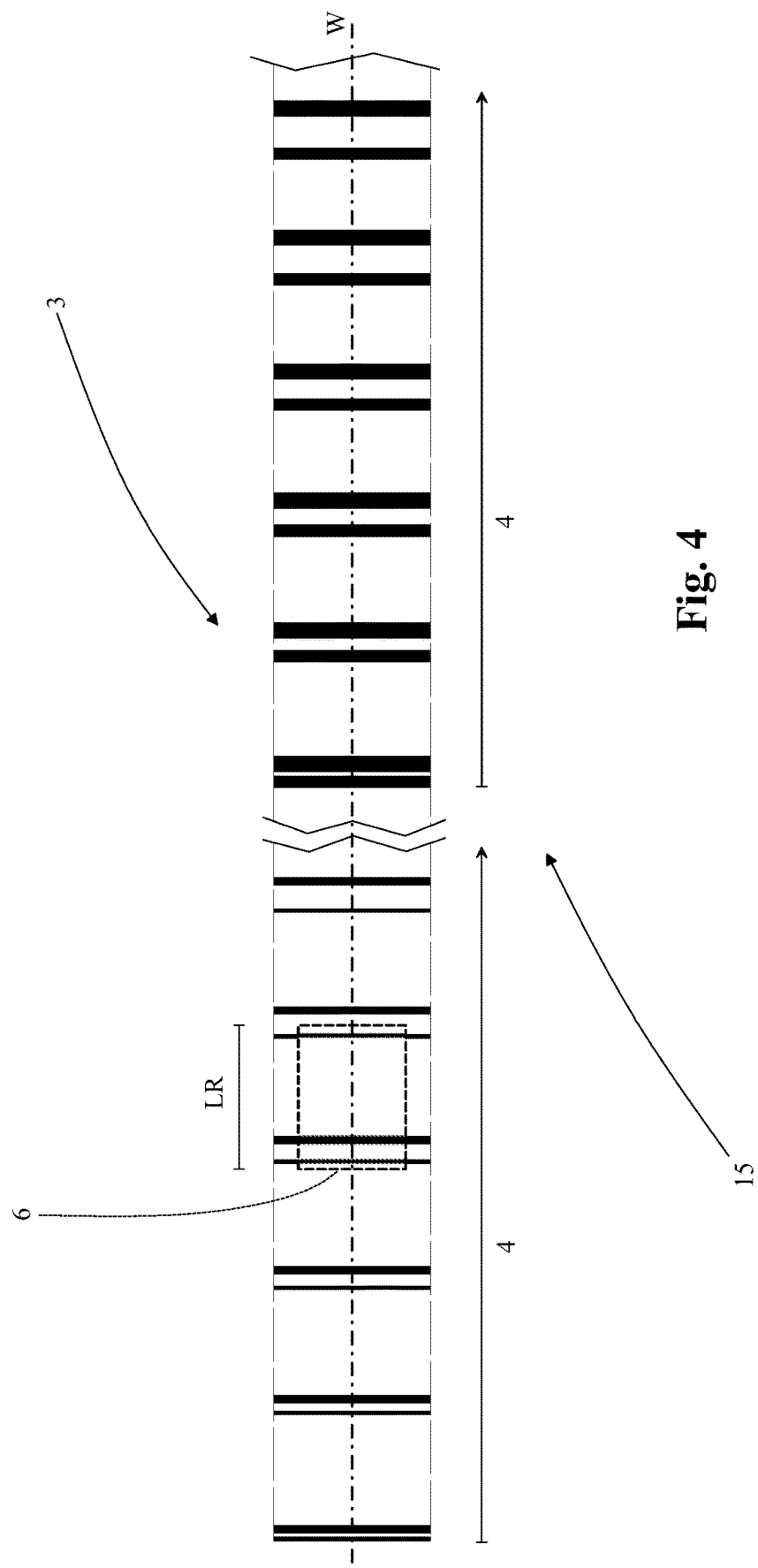
FIG. 4 illustrates a variant of the positioning track of the present system.
Figure 5:
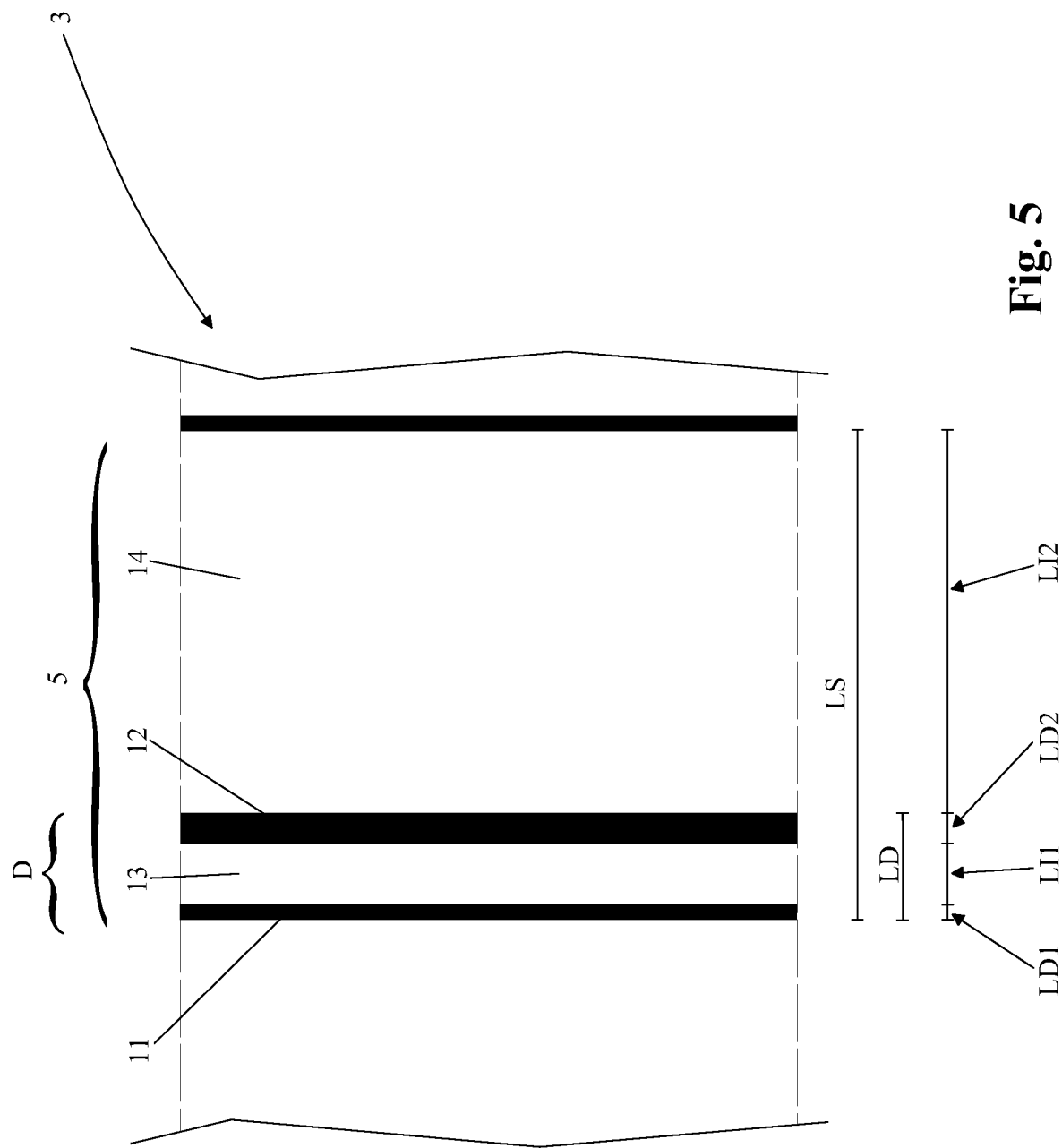
FIG. 5 illustrates an enlarged detail of the positioning track illustrated in FIG. 3 or 4, relative to a sector of the positioning track itself.

With reference to the examples illustrated in FIGS. 3 and 4, the positioning track 3 is provided with at least one succession 4 of multiple sectors 5 arranged one after the other along a measurement direction W, wherein each sector 5 is adjacent to the subsequent sector 5.

In accordance with the first embodiment illustrated in FIGS. 1-7 (in which the relative motion between the first mechanical member 101 and the second mechanical member 102 is linear), the measurement direction W of the positioning track is extended with rectilinear trajectory.

In accordance with the second embodiment illustrated in FIG. 8 (in which the relative motion between the first mechanical member 101 and the second mechanical member 102 is rotary), the measurement direction W of the positioning track 3 is extended with curved trajectory, in particular circular or with arc of a circle.

Advantageously, the positioning track 3 is obtained by means of machining of the surface of the second mechanical member 102, e.g. by means of laser ablation.

Each of the sectors 5 of the positioning track 3 is extended, along the aforesaid measurement direction W, for a specific sectional length LS which is preferably equal for all sectors 5.

The optical detection system 2 of the system 1 is arranged for delimiting, on the positioning track 3, a measurement window 6 which is intended to be traversed by the sectors 5 of the positioning track 3 itself and is extended, along the measurement direction W, for a detection length LR greater than or equal to the sectional length LS of each sector 5.

Advantageously, with reference to the example of FIG. 2, the optical detection system 2 comprises an emitter device 7, for example provided with one or more LEDs, directed towards the positioning track 3 and arranged for emitting light radiations at least on the measurement window 6 defined on the positioning track 3 in order to illuminate the sectors 5 of the latter that pass into such measurement window 6 itself.

In addition, the optical detection system 2 comprises an optical sensor 8, such as for example a linear sensor or a camera, provided with a sensitive surface directed towards the positioning track 3 in order to intercept the light radiations reflected by the positioning track 3 at the measurement window 6.

In particular, with reference to the first embodiment illustrated in FIGS. 1 and 2, the emitter device 7 and the optical sensor 8 are situated across from an observation opening 9 obtained on the jacket 101' of the hydraulic cylinder and facing the stem 106 of the piston 102' of the hydraulic cylinder itself.

With reference to the second embodiment illustrated in FIG. 8, the emitter device 7 and the optical sensor 8 are arranged across from the face of the rotatable disc 107 on which the positioning track 3 is obtained.

Advantageously, the optical detection system 2 is arranged for acquiring a series of images of the measurement window 6, and such images represent the area of the positioning track 3 within the measurement window 6 itself. In this manner, the optical detection system 2 acquires images of the sectors 5 of the positioning track 3 within the measurement window 6. Following such acquisition, the optical detection system 2 is arranged for generating a measurement signal SM representative of the aforesaid images and in particular of the sectors 5 of the positioning track 3 represented in such images. Advantageously, the system 1 comprises an electronic processing unit 10, for example comprising a microprocessor, which is operatively connected to the optical detection system 2 and is adapted to receive the measurement signal SM produced by the latter and to process such measurement signal SM in order to identify the position of the sector 5 in the succession 4 of the sectors 5 of the positioning track 3, so as to determine the position of the second mechanical member 102 with respect to the first mechanical member 101, as will be described in detail hereinbelow.

In accordance with the idea underlying the present invention, each sector 5 of the positioning track 3 comprises, with reference to the examples of FIGS. 3-7, a first delimitation section 11 and a second delimitation section 12 spaced from each other along the measurement direction W.

Advantageously, the first delimitation section 11 and the second delimitation section 12 of each sector 5 are extended, according to the measurement direction W, respectively for a first demarcation length LD1 and for a second demarcation length LD2.

In addition, each sector 5 comprises a first identification section 13 and a second identification section 14, which are provided with a different optical contrast with respect to the aforesaid first delimitation section 11 and second delimitation section 12. The first identification section 13 and the second identification section 14 of each sector 5 are extended, along the measurement direction W, respectively for a first identification length LI1 and for a second identification length LI2.

Advantageously, the sum of the first demarcation length LD1, of the second demarcation length LD2, of the first identification length LI1 and of the second identification length LI2 is equal to the sectional length LS of the corresponding sector 5.

According to the invention, in each sector 5, the first identification section 13 is interposed between the first delimitation section 11 and the second delimitation section 12 and is delimited, according to its first identification length LI1, by such first delimitation section 11 and second delimitation section 12.

In addition, in each sector 5, the second identification section 14 is separated from the first identification section 13 by the second delimitation section 12, in a manner such that the second delimitation section 12 is interposed between the first identification section 13 and the second identification section 14.

In particular, the second identification section 14 of each sector 5 is delimited, according to its second identification length LI2, between the second delimitation section 12 of the same sector 5 and the first delimitation section 11 of the subsequent sector 5.

More in detail, each delimitation section 11, 12 is divided from the identification sections 13, 14 adjacent thereto by two transition edges, preferably orthogonal to the measurement direction W.

In particular, each section 11, 12, 13, 14 is delimited, in its length LD1, LD2, LI1, LI2, by two corresponding aforesaid transition edges.

According to the invention, the first identification length LI1 of the first identification section 13 of each sector 5 is different from the first identification length LI1 of the first identification section 13 of each other sector 5 of the succession 4 of sectors 5.

In addition, the second identification length LI2 of the second identification section 14 of each sector 5 is different from the second identification length LI2 of the second identification section 14 of each other sector 5 of the succession 4 of sectors 5.

Preferably, in accordance with the embodiments illustrated in the enclosed figures, the first identification length LI1 of the first identification section 13 of each sector 5 is greater than a specific progression pitch PP of the first identification length LI1 of the first identification section 13 of the preceding sector 5 in the succession 4.

In addition, the second identification length LI2 of the second identification section 14 of each sector 5 is smaller than the aforesaid progression pitch PP of the second identification length LI2 of the second identification section 14 of the preceding sector 5 in the succession 4.

In accordance with a different embodiment variant not illustrated in the enclosed figures, the first identification length LI1 of the first identification section 13 of each sector 5 is smaller than the progression pitch PP of the first identification length LI1 of the first identification section 13 of the preceding sector 5 in the succession 4, and the second identification length LI2 of the second identification section 14 of each sector 5 is greater than the progression pitch PP of the second identification length LI2 of the second identification section 14 of the preceding sector 5 in the succession 4.

In this manner, advantageously, each sector 5 is unequivocally identified (in the succession 4) by the first identification length LI1 of the corresponding first identification section 13 and by the second identification length LI2 of the corresponding second identification section 14.

Therefore, when each sector 5 passes through the measurement window 6, from the measurement of the first identification length LI1 of the first identification section 13 or from the measurement of the second identification length LI2 of the second identification section 14 it is possible to identify the sector 5 in the succession 4 of sectors 5 and, therefore, it is possible to determine the position of such sector 5 along the positioning track 3. Consequently, in this manner it is possible to determine the position of the second mechanical member 102 (on which the positioning track 3 is arranged) with respect to the first mechanical member 101 (on which the optical detection system 2 is positioned).

Advantageously, the first and the second delimitation section 11 and 12 of each sector 5 are constituted by corresponding machined zones obtained (e.g. by means of laser machining) on the surface of the second mechanical member 102.

Preferably, the first and the second delimitation section 11 and 12 of each sector 5 have a reflection coefficient significantly lower than that of the first and of the second identification section 13 and 14.

For example, the first and the second delimitation section 11 and 12 of each sector 5 are obtained by means of machining (e.g. laser ablation) of corresponding zones of a chromium-plated surface in order to alter the optical properties of the chromium in such zones, significantly reducing the reflection coefficient thereof. In this manner, the machined zones of the chromium-plated surface define the delimitation sections 11 and 12 (with low reflection coefficient) while the remaining zones of the chromium-plated surface extended between the delimitation sections 11 and 12 define the identification sections 13 and 14 (with high reflection coefficient).

Advantageously, since each sector 5 is identified by the identification lengths LI1, LI2 of the identification sections 13, 14, the delimitation sections 11, 12 can be configured with demarcation lengths LD1, LD2 that are relatively small and hence such delimitation sections 11, 12 can be advantageously obtained with machined zones of reduced size (thus comprising a small area of the sector 5, even in the final sectors 5 of the succession 4), with consequent reduction of the times and costs of the production process for making the positioning track 3.

Advantageously, in each sector 5, the first demarcation length LD1 of the first delimitation section 11 is different from the second demarcation length LD2 of the second delimitation section 12.

In particular, the first demarcation length LD1 is greater (or smaller) than the second demarcation length LD2 by a specific shift pitch PC.

In this manner, for each sector 5 it is possible to identify the first delimitation section 11 with respect to the second delimitation section 12 by means of the measurement of the corresponding demarcation lengths LD1, LD2.

Figure 7:
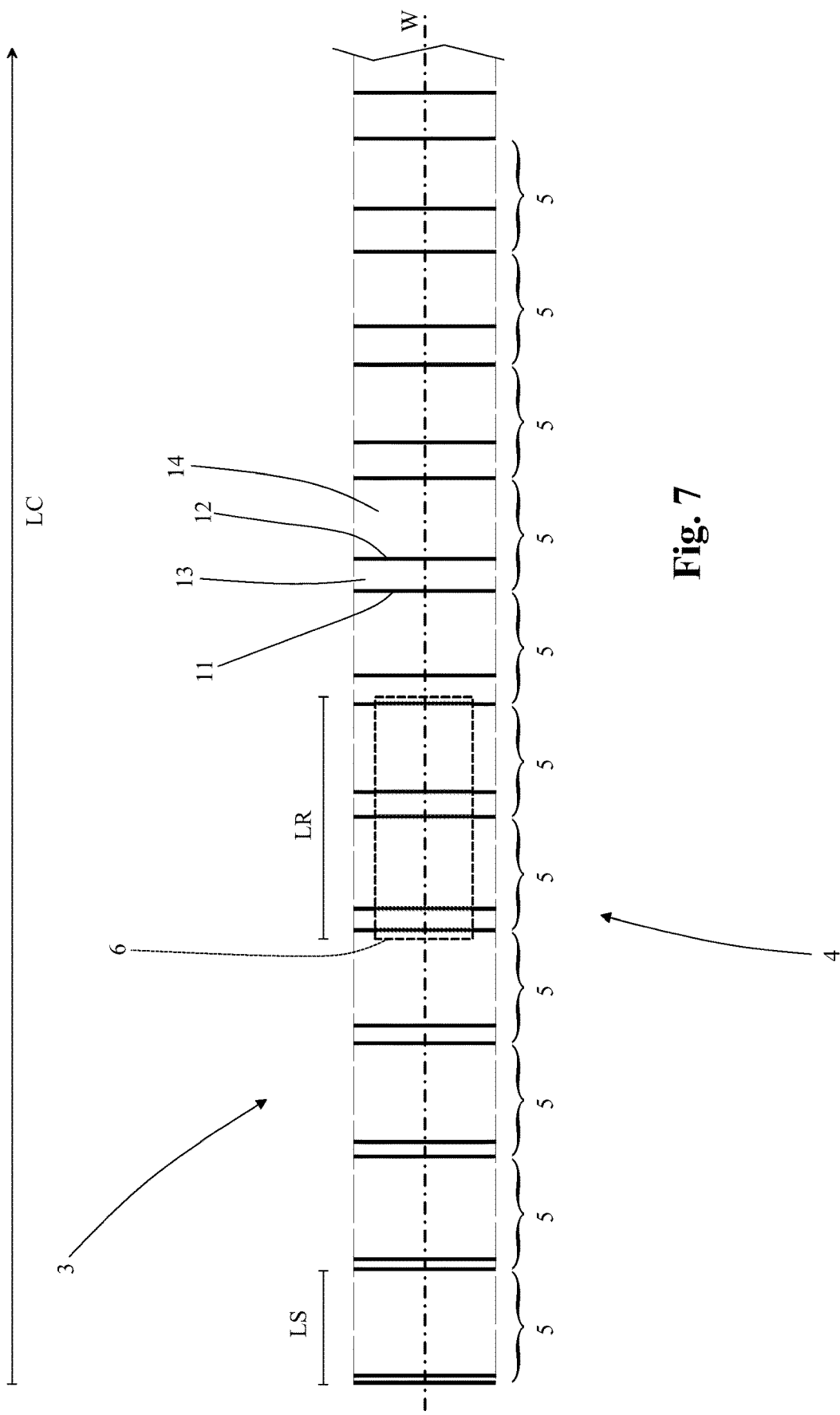
FIG. 7 illustrates a further variant of the positioning track of the present system.

In accordance with an embodiment variant of the present invention illustrated in FIG. 7, in each sector 5, the first demarcation length LD1 of the first delimitation section 11 is equal to the second demarcation length LD2 of the second delimitation section 12. In accordance with such embodiment variant, the detection length LR of the measurement window 6 is greater than or equal to double the sectional length LS of each sector 5, in a manner such that each image acquired by the optical detection system 2 contains at least two consecutive sectors 5, so as to distinguish the first delimitation section 11 from the second delimitation section 12 of each sector 5, by comparing the identification lengths LI1, LI2 of the identification sections 13, 14 of two consecutive sectors 5.

In accordance with a particular embodiment not illustrated in the enclosed figures, the succession 4 of sectors 5 of the positioning track 3 comprises an initial sector, which is provided with only one delimitation section (e.g. the first delimitation section 11) and with only one identification section (e.g. the first identification section 13) having different optical contrast.

Advantageously, with reference to the embodiment illustrated in FIG. 4, the positioning track 3 comprises a sequence 15 of multiple successions 4 of sectors 5, in particular arranged one adjacent to the next.

In particular, each succession 4 is extended, according to the measurement direction W, for a serial length LC given by the sum of the sectional lengths LS of the sectors 5 of the succession 4 itself.

The first demarcation length LD1 of the first delimitation section 11 of the sectors 5 of each succession 4 of the sequence 15 is different from the first demarcation length LD1 of the first delimitation section 11 of the sectors 5 of each other succession 4 of the sequence 15 itself.

In particular, the first demarcation length LD1 of the first delimitation sections 11 of the sectors 5 of each succession 4 is greater than a specific sequential pitch PQ of the first demarcation length LD1 of the first delimitation sections 11 of the sectors 5 of the preceding succession 4.

Preferably, the second demarcation length LD2 of the second delimitation section 12 of each sector 5 of the successions 4 of the sequence 15 is different from the second demarcation length LD2 of the second delimitation section 12 of each sector 5 of each other succession 4 of the sequence 15 itself.

In particular, the second demarcation length LD2 of the second demarcation sections 12 of the sectors 5 of each succession 4 is greater than the aforesaid sequential pitch PQ of the second demarcation length LD2 of the second delimitation sections 12 of the sectors 5 of the preceding succession 4.

In accordance with the abovementioned characteristics of the invention, the first demarcation length LD1 of the first delimitation section 11 (and preferably the second demarcation length LD2 of the second delimitation section 12) unequivocally identifies the sectors 5 of one succession 4 from the sectors 5 of the other successions 4 within the sequence 15 of the positioning track 3.

Therefore, from the measurement of the first demarcation length LD1 or of the second demarcation length LD2 of the delimitation sections 11, 12 within the measurement window 6, it is possible to identify in which succession 4 of the sequence 15 the measurement window 6 itself is arranged, in a manner such to measure (together with the information obtained from the identification sections 13, 14) the position of the second mechanical member 102 with respect to the first mechanical member 101.

Advantageously, the first demarcation length LD1 of the first delimitation section 11 of each sector 5 is equal to the first demarcation length LD1 of the first delimitation sections 11 of the sectors 5 of the same succession 4.

Preferably, the second demarcation length LD2 of the second delimitation section 12 of each sector 5 is equal to the second demarcation length LD2 of the second delimitation sections 12 of the sectors 5 of the same succession 4.

In this manner, advantageously, each succession 4 is identified by only one first demarcation length LD1 (or second demarcation length LD2), with consequent structural simplification of the system 1.

A specific embodiment of the system 1, object of the present invention, is reported hereinbelow.

In accordance with such specific embodiment, the optical sensor 8 of the optical detection system 2 has the sensitive surface of 256 pixels (in which each pixel measures 63.5 µm), therefore defining on the positioning track 3 a measurement window 6 having detection length LR equal to about 16 mm.

The sectional length LS of each sector 5 of the positioning track 3 is smaller than or equal to the detection length LR of the measurement window 6 and, in particular, it is equal to 13 mm.

The positioning track is 507 mm long and therefore comprises 39 sectors 5. Such sectors 5 are organized into two successions 4.

The progression PP, shift PC and sequential PQ pitches (e.g. determined by the mechanical resolution of the machining process or by the optical resolution of the optical sensor 8) are equal to 0.5 mm.

In the first succession 4, the first demarcation length LD1 of the first delimitation sections 11 is equal to 0.5 mm and the second demarcation length LD2 of the second delimitation sections 12 is equal to 1 mm.

In the second succession 4, the first demarcation length LD1 of the first delimitation sections 11 is equal to 1.5 mm and the second demarcation length LD2 of the second delimitation sections 12 is equal to 2 mm.

The first identification section 13 of the first sector 5 of each succession has the first identification length LI1 equal to 0.5 mm, with a progression pitch PP of the first identification sections 13 of the subsequent sectors 5 equal to 0.5 mm.

Indicating with D the packet given by the series of the first delimitation section 11, of the first identification section 13 and of the second delimitation section 12, such packet D has overall length LD=LD1+LI1+LD2. The second identification length LI2 of the second identification sections 14 is given by LI2=LS−LD.

Each succession 4 of sectors 5 can have a maximum number of sectors 5 given by the relation: (LS−LD1−LD2−PP)/PP.

In the numerical example discussed herein, the first succession 4 can have a maximum number of sectors 5 which is (13−0.5−1−0.5)/0.5=22 sectors 5.

The second succession 4 can have a maximum number of sectors 5 which is (13−1.5−2−0.5)/0.5=18 sectors 5.

In the discussed example, the first succession 4 has twenty-two sectors 5 and the second succession 4 has seventeen sectors 5 (hence there are a total of thirty-nine sectors 5).

In accordance with such example, the overall length of the delimitation sections 11, 12 (which in such example correspond to the machined zones) of all the sectors 5 of the first succession 4 is given by: 22*(0.5 mm+1 mm)=33 mm.

Taking as comparison the system of known type described in the patent application No. WO 2015/019231 discussed in the description of the state of the art, given the same length of the sectors, and with increment pitch of 0.5 mm, the positioning track of such system of known type could have a single succession of sectors having at most 13/0.5=26 sectors, since the 26nd sector is completely black, not allowing the making of further sectors and hence limiting the length of the positioning track to no more than 338 mm.

In addition, given the same number of sectors, the present system 1 has a significant reduction of the machined zones with respect to the aforesaid system of known type.

For example, considering a positioning track with twenty-two sectors, the overall length of the machined zones of the aforesaid system of known type is $$\sum_{n=1}^{22} n \times 0.5 = 125.5 \text{ mm}$$

while the system 1 object of the present invention has an overall length of the delimitation sections 11, 12 (which in such example correspond to the machined zones) of the first succession 4 of 33 mm, involving a reduction of nearly 75% of the machined zone, with consequent reduction of the times and costs of the machining process for making the positioning track.

It is disclosed hereinafter a method for measuring the position of a mechanical member by means of the present system 1, regarding which the same nomenclature introduced up to now will be maintained hereinbelow for the sake of description simplicity.

Figure 9:
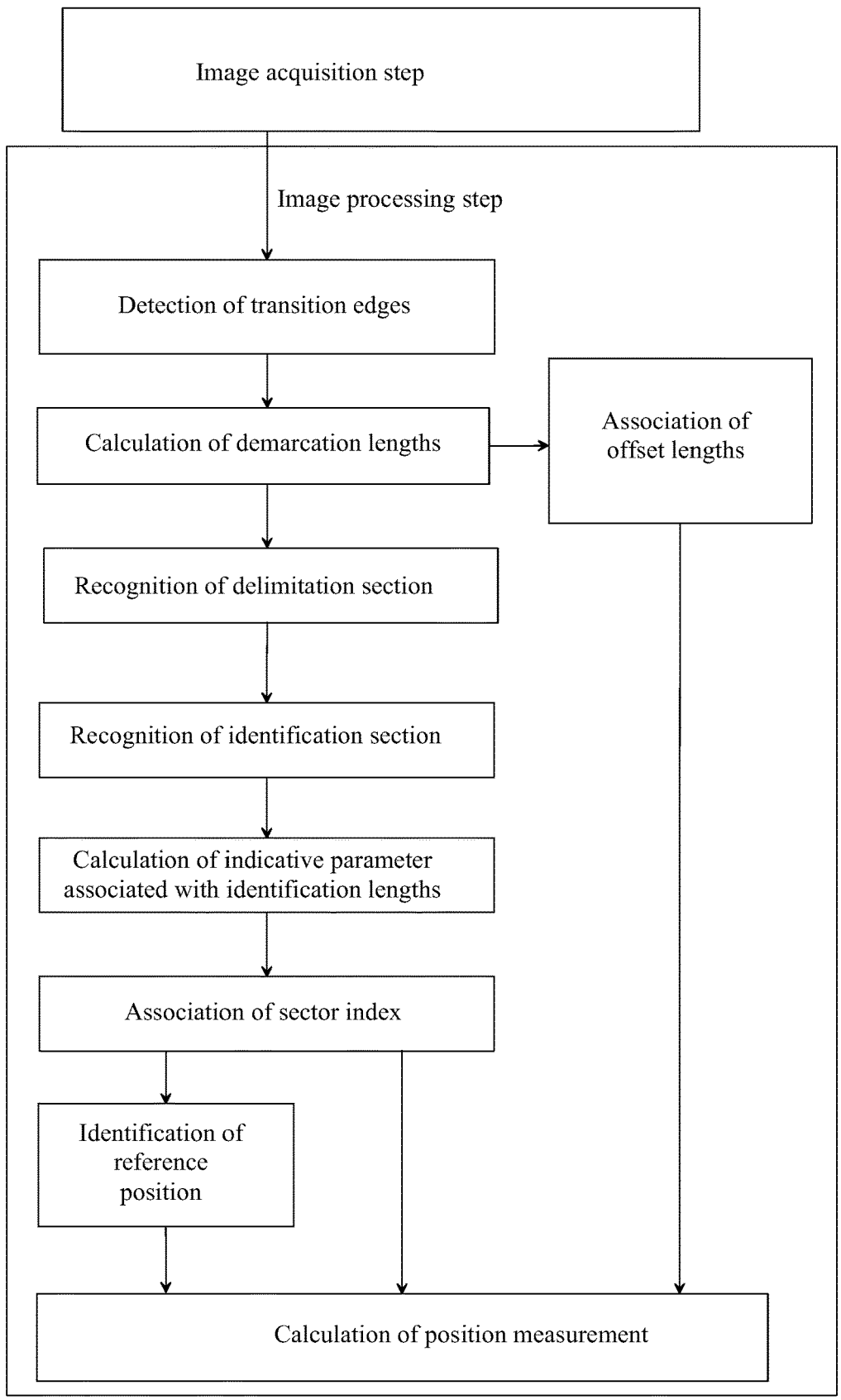
FIG. 9 illustrates a flow diagram relative to a measuring method that is performed by means of the system object of the present invention.

With reference to the example of FIG. 9, the present method comprises an acquisition step, in which the optical detection system 2 acquires at least one image of the positioning track 3 within the measurement window 6, and in particular a series of such images preferably with a specific acquisition frequency (e.g. several hundred images per second).

The aforesaid images contain a representation of the sections 11, 12, 13, 14 of the sectors 5 which are situated within the measurement window 6 at the time of acquisition of the images and which allow identifying the position of the positioning track 3 with respect to the optical detection system 2 and, therefore, the position of the second mechanical member 102 with respect to the first mechanical member 101.

In particular, if during the acquisition step the second mechanical member 102 is in relative movement with respect to the first mechanical member 101, the sections 11, 12, 13, 14 of the sectors 5 vary within the measurement window 6, as a function of the variation of the position of the second mechanical member 102 with respect to the first mechanical member 101.

Advantageously, in the acquisition step, the optical detection system 2 generates at least one impulse measurement signal SM, representative of the acquired images. With reference to the example of FIG. 6, the aforesaid measurement signal SM is provided with a series of peaks PS separated from each other by a series of valleys VS.

In particular, the peaks PS of the measurement signal SM represent the identification sections 13, 14 and the valleys VS of the measurement signal SM represent the delimitation sections 11, 12, in a manner such that the width of each peak PS represents the identification length LI1, LI2 of the corresponding identification section 13, 14, and the width of each valley VS represents the demarcation length LD1, LD2 of the corresponding delimitation section 11, 12.

Preferably, the width of each peak PS (or of each valley VS) of the measurement signal SM is delimited by two transitions T (substantially step-like or ramp-like), including in particular an ascending transition and a descending transition.

Such transitions T of the measurement signal SM represent the transition edges between the delimitation sections 11, 12 and the adjacent identification sections 13, 14.

Figure 6:
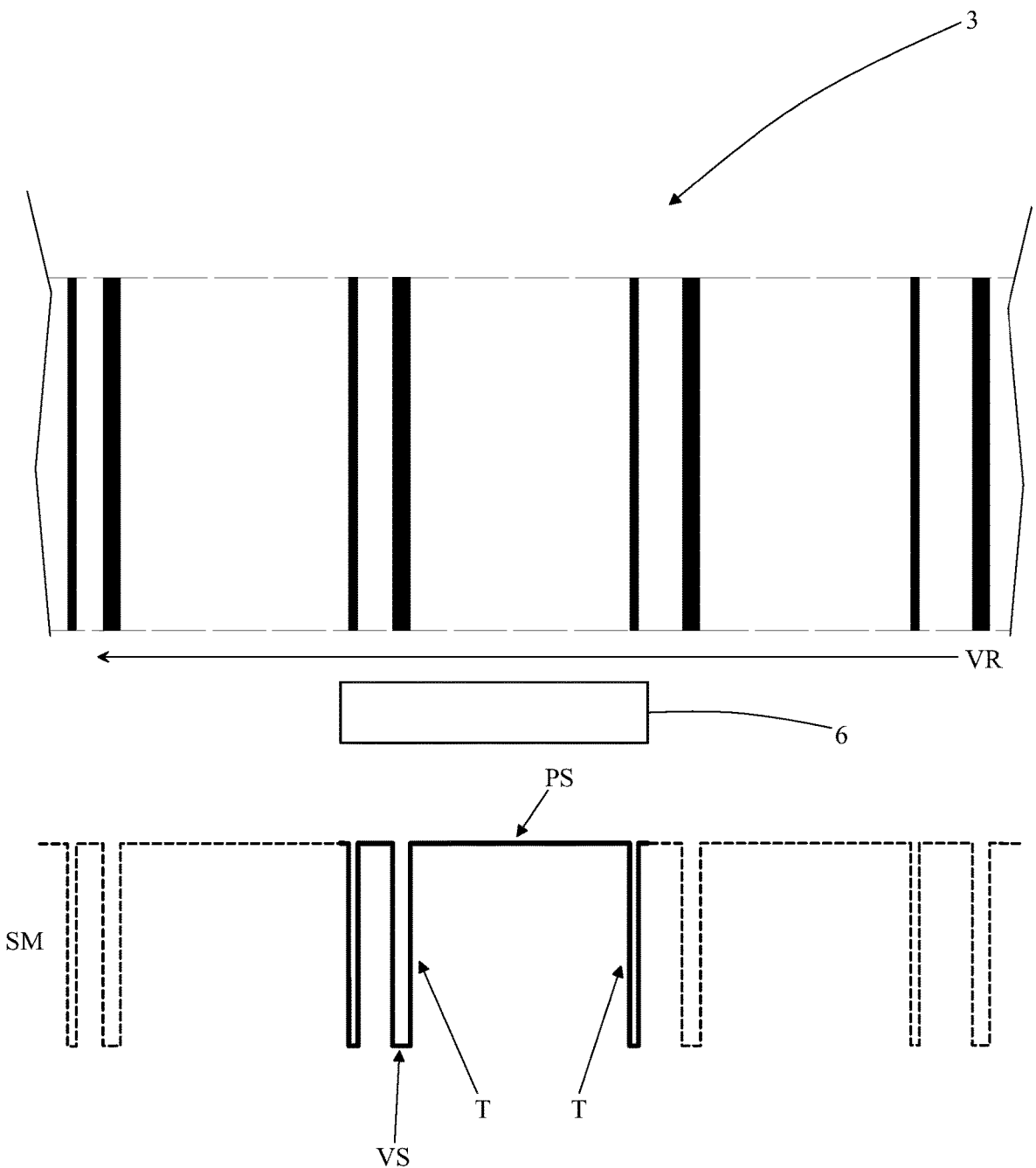
FIG. 6 illustrates a section of the positioning track illustrated in FIG. 3 or 4, with the corresponding measurement signal generated by the optical detection system.

In accordance with the example illustrated in FIG. 6, the measurement signal SM is represented, in particular for description simplicity, in analogue form.

Of course, without departing from the protective scope of the present patent, the measurement signal SM can also be implemented in digital form, for example comprising numeric sequences of quantized and discrete values over time. In this case, for example, the peaks PS and the valleys VS of the measurement signal SM are represented with corresponding values of the numeric sequences that implement the digital measurement signal SM.

The present method also comprises a step of processing the images acquired by the optical detection system 2, in particular obtained by means of the processing unit 10 of the system 1, which processes the measurement signal SM generated by the optical detection system 2 in the acquisition step.

The aforesaid processing step generates at least one position measurement MP indicative of the position of the second mechanical member 102 with respect to the first mechanical member 101.

According to the idea underlying the present invention, the processing step provides for detecting the transition edges present in each image acquired by the optical detection system 2, in particular according to a specific detection sense VR parallel to the measurement direction W.

As stated above, each of the transition edges divides one of the delimitation sections 11, 12 from the adjacent identification section 13, 14. Therefore, from the detection of the transition edges, it is possible to identify the delimitation sections 11, 12 and the identification sections 13, 14 present in the measurement window 6 at the time of acquisition of the image.

Advantageously, the transition edges are detected by identifying the transitions T of the measurement signal SM (according to the aforesaid detection sense VR), in a manner such to identify the peaks PS and the valleys VS of the measurement signal SM itself and, consequently, identify the corresponding identification sections 13, 14 and delimitation sections 11, 12 of the sectors 5 of the positioning track 3.

In particular, the detection of the transitions T of the measurement signal SM (and therefore of the transition edges of the sections 11, 12, 13, 14) is implemented by subjecting the measurement signal SM to processing processes of known type, such as thresholding, measuring the slopes, comparison with multiple thresholds etc., or to a combination of such processes.

Preferably, in the processing step, the information relative to the transition edges is acquired by the processing unit 10 of the system 1 in order to execute processing operations described hereinbelow for the purpose of calculating the position measurement MP.

In particular, the processing unit 10 acquires the transitions T of the measurement signal SM, mapping them in a memory unit such as a RAM memory.

The processing step of the present method provides for recognizing at least one of the delimitation sections 11, 12 present in the acquired image, in particular identifying if this is a first delimitation section 11 or a second delimitation section 12.

In particular, the delimitation section 11, 12 is recognized by means of the identification, in the aforesaid detection sense VR, of a descending transition T and a subsequent ascending transition T of the measurement signal SM, which between them delimit a valley VS to which the aforesaid recognized delimitation section 11, 12 corresponds.

Advantageously, the processing step provides for calculating the value of the demarcation length LD1, LD2 of the recognized delimitation section 11, 12, in particular by means of the measurement of the width of the corresponding valley VS of the measurement signal SM given by the distance, along the measurement direction, of the descending transition T from the ascending transition T (such transitions having been previously identified).

In particular, as stated above, the first demarcation length LD1 of the first delimitation section 11 of each sector 5 is different from the second demarcation length LD2 of the second delimitation section 12, in a manner such that, based on the value of the demarcation length LD1, LD2, it is possible to distinguish, in each sector 5, the first delimitation section 11 from the second delimitation section 12.

In particular, the processing unit 10 of the system 1 comprises a memory module, for example obtained with a ROM memory, which stores reference values of the demarcation lengths LD1, LD2 advantageously organized according to a specific data structure in which each reference value is associated with the corresponding demarcation length LD1, LD2 and, hence, with the corresponding delimitation section 11, 12.

Preferably, the processing step provides for comparing the value of the demarcation length LD1, LD2, previously calculated, with the reference values contained in the memory module of the processing unit 10, in a manner such that, following the aforesaid comparison, the calculated value of the demarcation length LD1, LD2 is associated with the corresponding delimitation section 11, 12.

Advantageously, the processing step provides for identifying the succession 4 (within the sequence 15 of successions 4) in which the previously-recognized delimitation section 11, 12 is situated.

Such identification is obtained as a function of the demarcation length LD1, LD2 of the recognized delimitation section 11, 12. As stated above, in fact, the demarcation lengths LD1, LD2 of the delimitation sections 11, 12 of each succession 4 of sectors 5 are different from the demarcation lengths LD1, LD2 of the delimitation sections 11, 12 of every other succession 4, in a manner such that the first demarcation length LD1 of the first delimitation section 11 (or the second demarcation length LD2 of the second delimitation section 12) unequivocally identifies the succession 4 to which such delimitation section 11, 12 belongs.

For such purpose, advantageously, the reference values of the demarcation lengths LD1, LD2 (archived in the data structure of the memory module of the processing unit 10) are associated with the corresponding succession 4 (e.g. with a corresponding succession index) and in particular are associated with a corresponding offset length LOFF associated with such corresponding succession 4. In particular, the aforesaid offset length LOFF represents the sum of the serial lengths LC of the successions 4 preceding the identified succession 4 and is intended to be advantageously employed for calculating the position measurement MP, as described in detail hereinbelow.

In accordance with the present invention, the processing step provides for recognizing at least one identification section 13, 14 associated with the previously-recognized delimitation section 11, 12 and in particular for recognizing an identification section 13, 14 adjacent to such delimitation section 11, 12.

The processing step provides for calculating an indicative parameter unequivocally associated with the identification length LI1, LI2 of the recognized identification section 13, 14.

For example, the aforesaid indicative parameter is the value of the first identification length LI1 or the value of the second identification length LI2 as a function of whether the first identification section 13 or the second identification section 14 is recognized. The processing step provides for associating the aforesaid indicative parameter with a corresponding sector index IS representative of the position, in the succession 4 of sectors 5, of the sector 5 containing the recognized identification section 13, 14. As stated above, in fact, each sector 5 is unequivocally identified (in the corresponding succession 4) by the first identification length LI1 of the corresponding first identification section 13 or by the second identification length LI2 of the corresponding second identification section 14.

For such purpose, advantageously, the memory module of the processing unit 10 of the system 1 contains reference values of the identification lengths LI1, LI2 advantageously organized according to a specific data structure in which each reference value is associated with the corresponding identification length LI1, LI2 and, hence, the corresponding sector index IS.

Preferably, the processing step provides for comparing the indicative parameter (in particular the value of the identification length LI1, LI2), previously calculated, with the reference values of the identification lengths LI1, LI2 contained in the memory module of the processing unit 10, in a manner such that, following the aforesaid comparison, the indicative parameter is associated with the corresponding sector index IS.

The processing step provides for calculating the position measurement MP as a function at least of the aforesaid sector index IS, as discussed in detail hereinbelow.

Advantageously, the processing step provides for identifying, between the transition edges present in the measurement window 6, a reference edge which indicates a reference position PR in the sector 5 along the measurement direction W, and which is considered as a pointer for the calculation of the position measurement MP.

More in detail, the position measurement MP is obtained by summing the aforesaid reference position PR with the product of the sector index IS (previously identified) times the sectional length LS and, advantageously, with the offset length LOFF, according to the relation: MP=PR+IS×LS+ LOFF.

With reference to the particular example illustrated in the flow diagram of FIG. 10, an exemplifying embodiment of the processing step of the method, object of the present invention, is described hereinbelow.

In particular, the following is considered in the discussed example:
- the rectilinear measurement direction W;
- with reference to the example of FIG. 6, the detection sense VR proceeds along the measurement direction W from right to left of the page;
- the reading of the pixels on the image of the measurement window 6 occurs according to the detection sense VR illustrated in FIG. 6 (from right to left).

With reference to the examples of FIGS. 6 and 10, the processing step comprises a first processing block 201 which detects the transition edges of the sections 11, 12, 13, 14 present in the measurement window 6 (and represented in the image acquired by the optical detection system 2). In particular, such detection is implemented by identifying the transitions T of the measurement signal SM representative of the acquired image and implementing a series of transitions T (indicated with T1, T2, T3, T4, . . . ) within the memory unit (RAM memory) of the processing unit 10.

The method then comprises a first control block 202 which verifies if the number of identified transitions T is less than three.

In case of positive response, the first transition T1 of the series is associated with the reference position PR which is in turn associated with the position measurement MP (by means of a first calculation block 203).

In case of negative response to the first control block 202, the processing step provides for a second control block 204 which verifies if the first transition T1 is a descending transition of the measurement signal SM.

In case of positive response, a second processing block 205 is provided in which the distance DT is calculated between the second transition T2 and the first transition T1 (which corresponds with the width of the valley VS between such transitions T1 and T2).

A third processing block 206 is then provided, adapted to identify the succession 4 affected by the measurement window 6 as a function of the calculated distance DT.

More in detail, the distance DT is compared with the reference values of the demarcation lengths LD1, LD2 archived in the storage module of the processing unit 10 and, consequently, a corresponding succession index and a corresponding offset length LOFF are selected.

Subsequently, the processing step provides for a third control block 207 which verifies if the valley VS between the two transitions T1, T2 corresponds with one of the first delimitation sections 11 or with one of the second delimitation sections 12.

More in detail, the third control block 207 verifies if the distance DT is equal to the first demarcation length LD1 of the first delimitation section 11, in particular comparing the distance DT with the reference values of the demarcation lengths LD1, LD2 archived in the memory module of the processing unit 10.

In case of positive response to the third control block 207, a fourth processing block 208 is provided which calculates the second identification length LI2 of the second identification section 14 as distance between the third transition T3 and the second transition T2. The fourth processing block 208 associates the second identification length LI2 with the corresponding sector index IS, by comparing the value of such identification length LI2 with the reference values of the second identification lengths LI2 archived in the memory module of the processing unit 10 and by selecting the corresponding sector index IS.

A second calculation block 209 is then provided which associates the second transition T2 with the reference position PR and calculates the position measurement MP according to the relation: MP=T2+IS×LS+ LOFF.

In case of negative response to the third control block 207, a fifth processing block 210 is provided which calculates the overall length LD of the packet D (given by the series of the first delimitation section 11, of the first identification section 13 and of the second delimitation section 12) as distance between the fourth transition T4 and the first transition T1 and then obtains the second identification length LI2 as difference between the sectional length LS and the overall length LD of the packet D.

The second identification length LI2 is associated with the corresponding sector index IS, in a manner analogous to that provided for the above-described fourth processing block 208.

A third calculation block 211 is then provided, which associates the fourth transition T4 with the reference position PR and calculates the position measurement MP according to the relation: MP=T4+IS×LS+ LOFF.

In case of negative response to the second control block 204, i.e. in the case in which the first transition T1 is an ascending transition of the measurement signal SM, a sixth processing block 212 is provided in which the distance DT is calculated between the third transition T3 and the second transition T2 (which corresponds with the width of the valley VS between such transitions T3 and T2).

A seventh processing block 213 is then provided that is adapted to identify the succession 4 affected by the measurement window 6 as a function of the calculated distance DT, in a manner analogous to that implemented by the previously-described third processing block 206.

Subsequently, the processing step provides for a fourth control block 214 which verifies if the valley VS between the two transitions T3 and T2 corresponds with one of the first delimitation sections 11 or with one of the second delimitation sections 12, in a manner analogous to that implemented by the third control block 207.

In case of positive response to the fourth control block 214, a seventh processing block 215 is provided which calculates the first identification length LI1 of the first identification section 13 as the difference between the second transition T2 and the first transition T1, from which the overall length LD of the packet D (LD=LI1+LD1+LD2) derives and then it obtains the second identification length LI2 as the difference between the sectional length LS and the overall length of the packet D.

The second identification length LI2 is associated with the corresponding sector index IS, in a manner analogous to that provided for the above-described fourth and fifth processing block 208, 210.

A fourth calculation block 216 is then provided for which associates the third transition T3 to the reference position PR and calculates the position measurement MP according to the relation: MP=T3+IS×LS+ LOFF.

In case of negative response to the fourth control block 214, an eighth processing block 217 is provided which calculates the second identification length LI2 of the second identification section 14 as distance between the second transition T2 and the first transition T1 and associates such length LI2 with the corresponding sector index IS, in a manner analogous to that provided for the seventh processing block 215.

A fifth calculation block 218 is then provided which associates the first transition T1 with the reference position PR and calculates the position measurement MP according to the relation: MP=T1+IS×LS+ LOFF.

The invention thus conceived therefore attains the pre-established objects.

The invention claimed is:

1. A system (1) for measuring the position of a mechanical member, the system (1) comprising:
    an optical detection system (2), which is intended to be arranged on a first mechanical member (101) of a mechanical device (100);
    a positioning track (3), which is intended to be arranged on a second mechanical member (102) of said mechanical device (100), said second mechanical member (102) being susceptible of relative motion with respect to said first mechanical member (101);
    wherein said positioning track (3) is provided with at least one succession (4) of multiple sectors (5), arranged one after the other along a measurement direction (W), and each of said sectors (5) is extended, along said measurement direction (W), for a specific sectional length (LS);
    wherein said optical detection system (2) is arranged for delimiting, on said positioning track (3), a measurement window (6) which is intended to be traversed by said sectors (5) and is extended, along said measurement direction (W), for a detection length (LR) greater than or equal to said sectional length (LS) of each said sector (5);
    wherein each said sector (5) comprises:
        a first delimitation section (11) and a second delimitation section (12) spaced from each other along said measurement direction (W);
        a first identification section (13) and a second identification section (14), which are provided with a different optical contrast with respect to said first delimitation section (11) and said second delimitation section (12), and are extended, along said measurement direction (W), respectively for a first identification length (LI1) and for a second identification length (LI2);
    wherein, in each said sector (5), said first identification section (13) is delimited, according to said first identification length (LI1), between said first delimitation section (11) and said second delimitation section (12), and said second identification section (14) is separated from said first identification section (13) by said second delimitation section (12);
    wherein the first identification length (LI1) of the first identification section (13) of each said sector (5) is different from the first identification length (LI1) of the first identification section (13) of each other said sector (5) of said succession (4);
    wherein the second identification length (LI2) of the second identification section (14) of each said sector (5) is different from the second identification length (LI2) of the second identification section (14) of each other said sector (5) of said succession (4);
    wherein the first identification length (LI1) of the first identification section (13) of each said sector (5) is greater or less, by a specific progression pitch (PP), than the first identification length (LI1) of the first identification section (13) of the preceding sector (5) in said succession (4).

2. The system (1) of claim 1, wherein the first delimitation section (11) and the second delimitation section (12) of each said sector (5) are extended, according to said measurement direction (W), respectively for a first demarcation length (LD1) and for a second demarcation length (LD2); the sum of said first demarcation length (LD1), of said second demarcation length (LD2), of said first identification length (LI1) and of said second identification length (LI2) being equal to said sectional length (LS).

3. The system (1) of claim 2, wherein, in each said sector (5), the first demarcation length (LD1) of said first delimitation section (11) is different from the second demarcation length (LD2) of said second delimitation section (12).

4. The system (1) of claim 2, wherein said positioning track (3) comprises a sequence (15) of multiple said successions (4);

wherein the first demarcation length (LD1) of the first delimitation sections (11) of the sectors (5) of one of said successions (4) is different from the first demarcation length (LD1) of the first delimitation sections (11) of the sectors (5) of each other succession (4) of said sequence (15).

5. The system (1) of claim 4, wherein, in each succession (4) of said sequence (15), the first demarcation length (LD1) of the first delimitation section (11) of each sector (5) is equal to the first demarcation length (LD1) of the first delimitation section (11) of each other sector (5) of said succession (4).

6. The system (1) of claim 1, wherein said optical detection system (2) comprises:
- an emitter device (7) directed towards said positioning track (3) and arranged for emitting first light radiations at least on said measurement window (6) defined on said positioning track (3);
- an optical sensor (8) directed towards said positioning track (3) and arranged for intercepting second light radiations reflected by said positioning track (3) at the measurement window (6).

* * * * *